Dec. 9, 1930.　　　F. H. NAGGATZ　　　1,784,196
ADJUSTABLE LICENSE PLATE HOLDER
Filed May 8, 1930
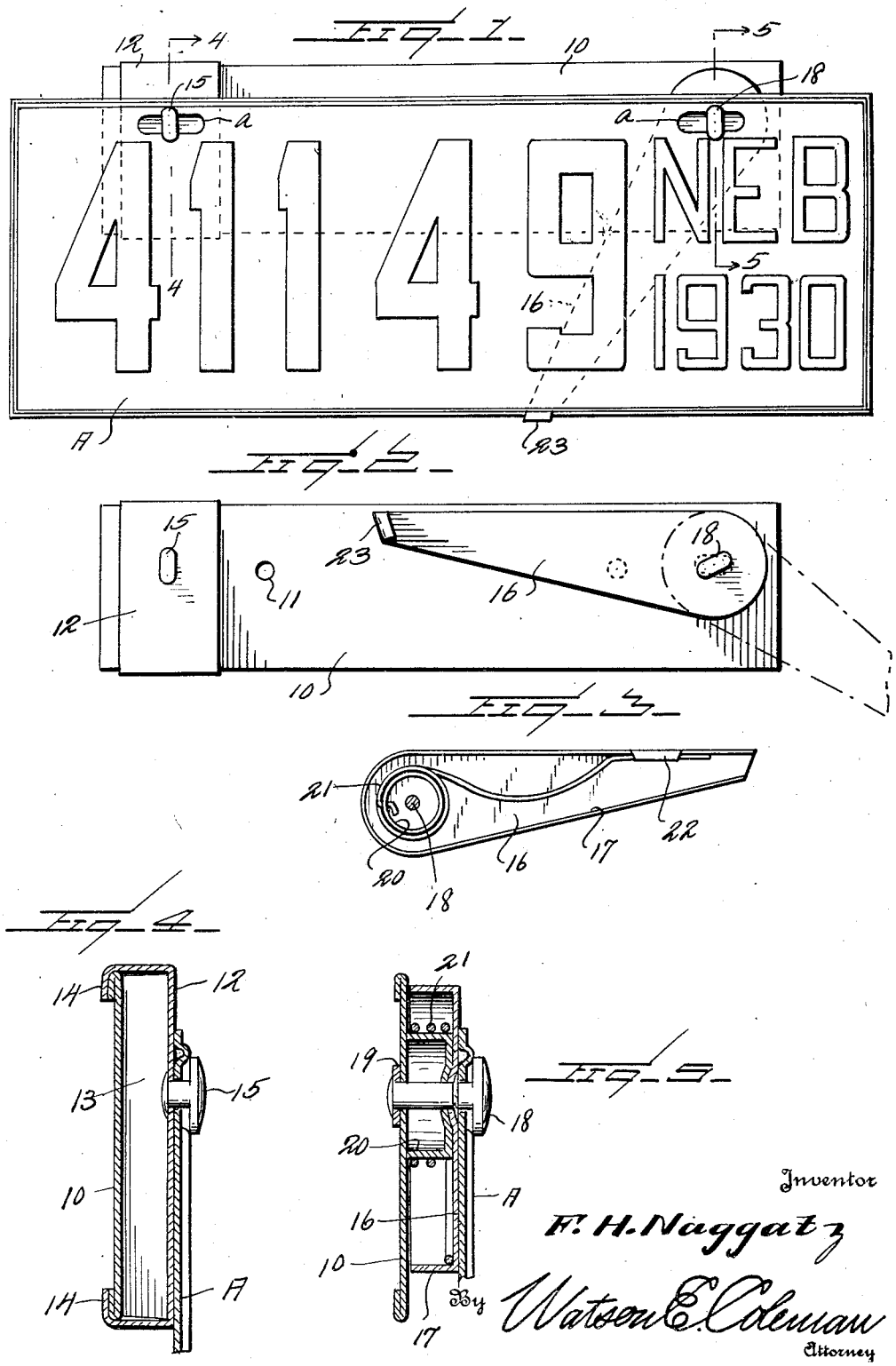

Patented Dec. 9, 1930

1,784,196

UNITED STATES PATENT OFFICE

FRANK H. NAGGATZ, OF FAIRMOUNT, NORTH DAKOTA

ADJUSTABLE LICENSE-PLATE HOLDER

Application filed May 8, 1930. Serial No. 450,802.

This invention relates to devices for holding license plates on automobiles and the particular object of the invention is to provide a holder of this character by which a license plate may be readily engaged with an automobile without the necessity of bolting it thereto or as readily disengaged therefrom and a further object is to provide a holder of this character which is adjustable so as to hold license plates of different sizes wherein the slots for the passage of the bolts are differently placed.

A further object is to provide a holder of this character having a fixed T-shaped stud at one end and at the other end a rotatable T-shaped stud having a lever, the T-shaped studs being adapted to be inserted through the slots of the license plate, one of the studs being then turned out by a spring into a position transverse to the slot of the plate so as to thereby hold the plate from detachment.

Other objects will appear in the course of the following description.

My invention is illustrated in the accompanying drawings, wherein:—

Figure 1 is a front elevation of my license plate holder showing the license plate in place;

Figure 2 is a front view of the license plate holder with the license plate removed;

Figure 3 is an elevation of a rear face of the holding arm 16;

Figure 4 is a section on the line 4—4 of Figure 1;

Figure 5 is a section on the line 5—5 of Figure 1.

Referring to this drawing, A designates a license plate of the usual character having the longitudinally extending slots a adjacent its upper edge at its upper ends, these slots being used for the passage of bolts whereby the license plate may be attached to the car.

My improved device for holding a license plate on a car consists of a plate 10 of sheet metal which is provided with bolt holes 11 whereby it may be bolted to the car, and is provided at one end with a slide 12 preferably formed of sheet metal and having the lateral flanges 13 and the overturned end flanges 14 which embrace the edges of the plate 10. This slide has brazed, welded or otherwise permanently attached to it the T-shaped stud 15 whose head extends transversely to the length of the plate 10.

At the opposite end of the plate 10, there is provided a lever 16 of sheet metal, the lever having a semicircular inner end and tapering toward its outer free end and being preferably formed of sheet metal having a marginal inturned flange 17. This lever carries upon it the T-shaped stud 18 which is brazed, welded or otherwise attached to the body of the lever in any suitable manner, the shank of the stud extending through and slightly beyond the lever and passing through the plate 10 and being overturned upon a washer 19 so that this shank of the stud 18 is pivotally engaged with the lever for oscillation therewith. The head of the lever extends normally transversely of the length of the plate 10.

Mounted upon the plate 10 as by brazing, welding or otherwise is a drum or hub 20 through which the stud 18 passes, this drum or hub extending up inside of the lever and bearing against the outer face thereof. Surrounding this drum or hub is a coiled spring 21 which is engaged with the hub against rotation and this spring extends along the lever and its extremity is engaged by a lip 22 on the lever. The extremity of the lever is formed with an overturned lug 23 constituting a hook. The spring normally urges the lever outward against the license plate and resists rotation of the lever in a counter clockwise direction in Figure 3.

In use, the plate 10 is bolted to the machine in the usual manner by bolts passing through the apertures in the plate. One of the slots a in the license plate is then engaged over the head of the stud 15 and then the license plate is turned so that the slot a is angularly disposed with reference to the T-shaped stud 15. The lever is shifted in a counter-clockwise direction until the stud 18 is parallel to the length of the plate 10. Then the other slot a of the license plate is inserted over this stud 18 and then released, whereupon the spring will urge the lever in a clockwise direction until the hook 23 engages over the edge of the license plate. The license plate will then be engaged with the plate 10 and can not become accidentally disengaged. If it be desired to take off the license plate, the lever is shifted in a counter-clockwise direction until its stud is parallel to the length of the plate 10.

Then this end of the license plate is lifted off of its engagement with the stud and the license plate is then swung downward until the other slot is parallel to the head of the stud 15. Then the license plate may be taken off. It will be seen that this device is very simple, that it may be cheaply made, that it holds the license plate firmly in position, but permits the license plate to be readily changed.

It is to be particularly noted that the slide 12 is adjustable upon the extremity of the plate 10 so that this license plate holder will suit different lengths of license plate or plates where the slots are differently spaced from each other. It will be obvious that many minor changes might be made in the details without departing from the spirit of the invention as defined in the appended claims.

I claim:—

1. A license plate holder including a supporting plate, an outwardly projecting T-shaped stud carried at one end of the plate and permanently extending transversely thereto and an outwardly projecting T-shaped stud oscillatably mounted at the other end of the plate, and resilient means urging the stud in a direction transverse to the length of the plate, but permitting the stud to be turned into parallel relation to the plate.

2. A license plate holder including a supporting plate, an outwardly projecting T-shape stud carried at one end of the plate and permanently extending transversely to the length thereof, a lever oscillatably mounted upon the other end of the plate and carrying an outwardly projecting T-shaped stud, and a spring operatively engaging the lever and plate and urging the lever into a position where its stud is transverse to the length of the plate, said spring permitting the lever to be shifted to a position with its stud parallel to the length of the plate.

3. A license plate holder including a supporting plate having an outwardly projecting T-shaped stud at one end permanently extending transversely to the length of the plate, a lever pivotally mounted at the opposite end of the plate and having a T-shaped stud disposed at the axis of rotation of the lever, a spring urging the free end of the lever toward the lower edge of the plate, the stud being so disposed that in this position of the lever its head is transverse to the length of the plate, the spring permitting the lever to be turned to carry its free end away from the plate and shift the stud into a position where its head is parallel to the plate.

4. A license plate holder including a supporting plate having means whereby it may be attached to an automobile, one end of the plate carrying an outwardly projecting T-shaped stud having its head extending transverse to the length of the plate, a T-shaped stud extending through the plate at its opposite end thereof and rotatable in the plate, a lever surrounding the T-shaped stud and to which it is attached, the lever being disposed in angular relation to the head of the stud, the lever being formed of sheet metal having flanged edges, a circular hub through which the stud passes, the hub being attached to the plate, and a coiled spring surrounding the hub and attached thereto at one end and extending along the lever at the other end to be engaged therewith, the spring acting to shift the free end of the lever toward the lower edge of said plate, the extremity of the lever being provided with a hook adapted to engage the lower edge of a license plate mounted upon said studs.

5. A license plate holder including a supporting plate, a slide mounted upon one end of said plate and carrying a T-shaped stud, the head of the stud extending transversely of said plate and carrying a T-shaped stud, rotatably mounted upon the other end of the plate and having a lever attached thereto whereby the stud may be rotated, and a spring urging the free end of the lever toward the adjacent edge of the plate and the stud into a position with its head extending transversely to the length of the plate.

In testimony whereof I hereunto affix my signature.

FRANK H. NAGGATZ.